Feb. 13, 1968  E. K. VAALIMAA ET AL  3,368,706
TRACTOR-MOUNTED LOAD-HANDLING APPARATUS
Filed Aug. 30, 1965  2 Sheets-Sheet 1

INVENTORS:
E. K. Vaalimaa, V. J. Sarvela and J. H. Sarvela
BY Richards & Geier
ATTORNEYS

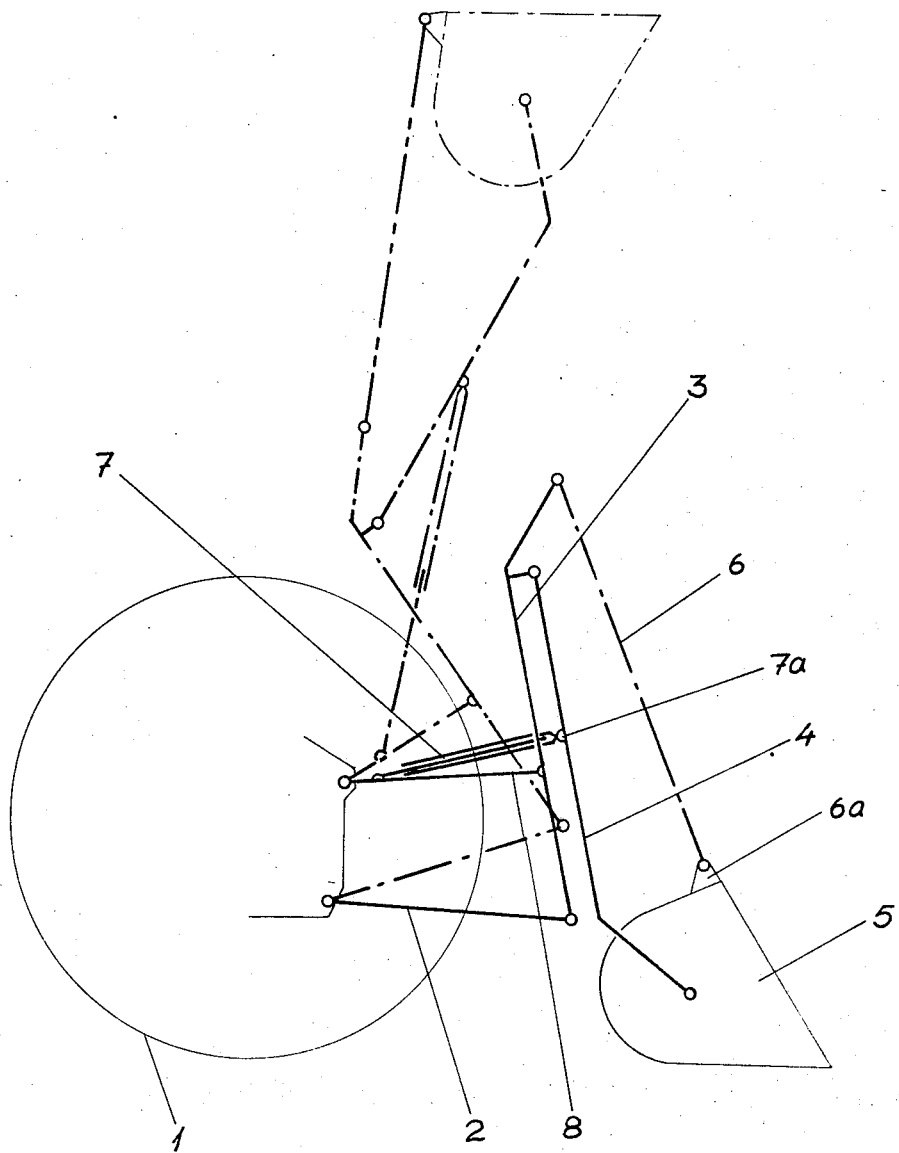

United States Patent Office 3,368,706
Patented Feb. 13, 1968

1

3,368,706
TRACTOR-MOUNTED LOAD-HANDLING
APPARATUS
Eino Kalervo Vaalimaa, Peltosalmen Konepaja, Iisalmi,
Finland; Vilho Juhani Sarvela, Menninkaisentic 10C,
Tapiola, Finland; and Jaakko Hermann Sarvela, Pelto-
salmen Konepaja, Iisalmi, Finland
Filed Aug. 30, 1965, Ser. No. 483,722
2 Claims. (Cl. 214—766)

This invention relates to a tractor-mounted load-han-
dling apparatus.

An object of the invention is intended to provide an im-
proved tractor-mounted load-handling apparatus which
is not of complicated construction but facilitates lifting
loads to heights which are suitable in many instances.

According to the invention there is provided a tractor-
mounted load-handling apparatus comprising a substan-
tially upright main frame attached to the tractor and at
least one load-raising device including a swinging mem-
ber mounted for swinging about a horizontal axis near
the top of the main frame, a load-holding element at-
tached to the swinging member remote from the said hori-
zontal axis, and a hydraulic or pneumatic jack pivotally
attached to the tractor and to the swinging member, the
arrangement being such when the jack is retracted the
swinging member is substantially parallel to the main
frame and when the jack is extended the swinging mem-
ber is swung up to or past the horizontal position. Further
and optional features of the invention appear from the
following description and the appended claims.

Figure 1:
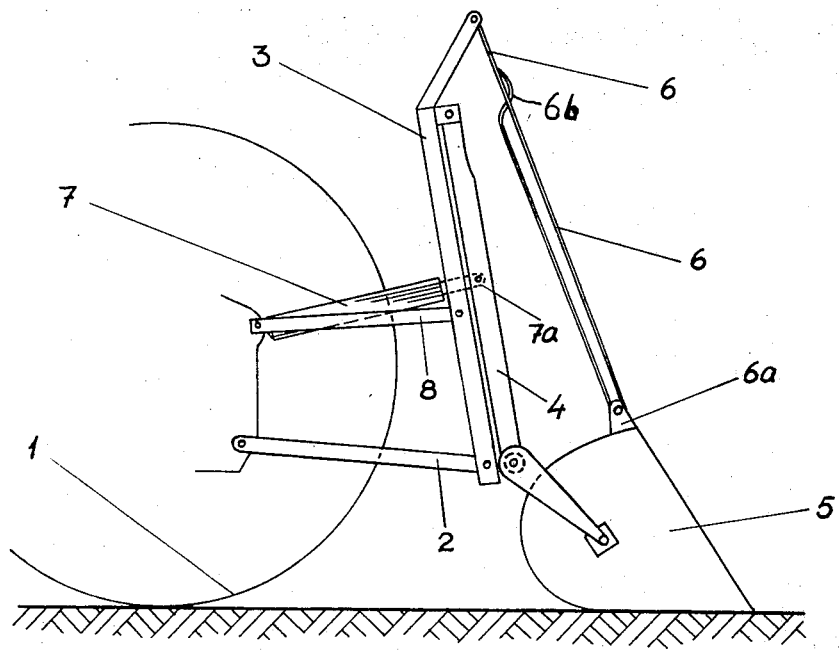
Figure 2:
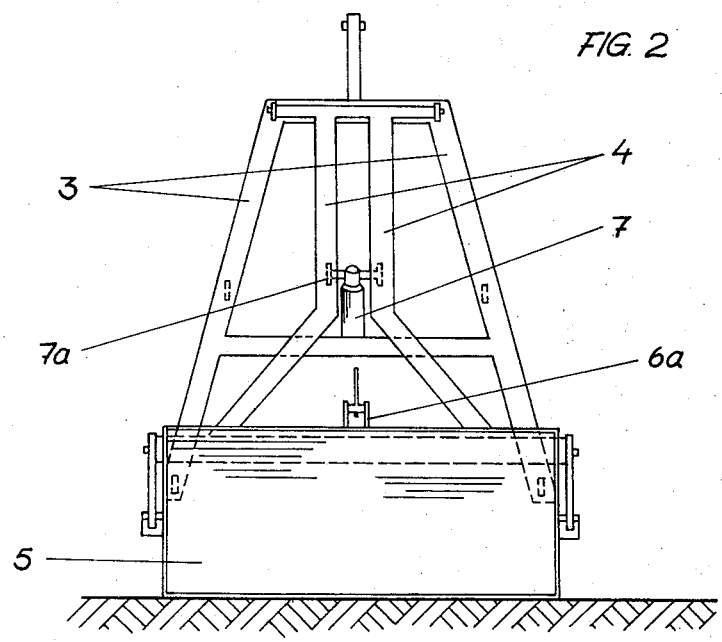

An apparatus in accordance with the invention is illus-
trated by way of example in the accompanying drawings, FIG. 1 being a side view showing the apparatus in its
loading position in full lines and indicating the raised
position of some parts in dotted lines, and FIG. 2 is a rear view of the apparatus in its loading
position.

FIG. 3 is a side view of the apparatus showing the
scoop in still a further elevated position.

In FIGURE 1 are indicated the rear axle casing and a
wheel of a tractor 1 comprising tow-bars 2.

The loading-handling apparatus comprises a substan-
tially upright main frame 3 the lower end of which is at-
tached to the tow-bars 2. The frame 3 is further attached
to the tractor by links 8 disposed higher than the tow-
bars 2.

The apparatus comprises a load-raising device includ-
ing a swinging member 4, a load-holding element in the
form of a scoop 5, and a hydraulic or pneumatic jack 7.
The member 4 is mounted for swinging about a hori-
zontal axis near the top of the frame 3. The scoop is
pivotally attached to the member 4 remote from the said
horizontal axis, and the jack 7 is pivotally attached to the
tractor and to the member 4. When the jack 7 is re-
tracted the member 4 is substantially parallel to the frame

2

3 as shown in full lines in FIGURE 1, and when the jack
7 is extended the member 4 is swung up to or past the
horizontal position as indicated in dotted lines.

The jack 7 and the links 8 have a common pivotal axis
where they are attached to the tractor, the position 7a at
which the jack 7 is attached to the member 4 being ad-
justable.

A snap-locking link 6 is pivotally attached to an up-
wardly-extending arm at the top of the frame 3 and to
lugs 6a on the scoop 5 for selectively keeping the scoop 5
in its load-holding position or allowing it to tilt to release
a load. As shown in FIG. 1, the term "snap locking link"
is used to describe a link having a longer portion con-
nected to said arm and a shorter portion terminating in
a curved end 6b extending over the longer portion.

If, as is usual, the tow-bars 2 are power-liftable the
power from both these tow-bars and the jack 7 can be used
in picking a load from the ground and the load can be
raised to a greater height.

Various modifications may be introduced without de-
parting from the invention as defined in the appended
claims, for example a fork or platform or hook may be
substituted for the scoop 5 and several swinging mem-
bers each with its own jack and load-holding element may
be provided instead of the frame-like member 4.

What we claim is:

1. In combination with a tractor, a load-handling ap-
paratus comprising an upright frame, tow-bars connecting
the lower end of said frame to said tractor, at least one
link connecting the middle part of said frame to said
tractor, an elongated swinging member having an upper
end swingably connected with said frame adjacent the
top of said frame, said swinging member in its inopera-
tive position extending substantially parallel and close
to said frame, a jack adjustably connected to said swing-
ing member intermediate the ends of said swinging mem-
ber, means pivotally connecting said jack to said tractor
close to the connection of said link to said tractor, said
jack swinging said swinging member from said inopera-
tive position to at least a horizontal position, and a load-
holding member connected with the lower end of said
swinging member.

2. A load-handling apparatus in accordance with claim
1, comprising another link, an arm carried by the top of
the frame and connected to one end of said other link, and
a lug carried by said load-holding member and connected
to the other end of said other link.

References Cited
FOREIGN PATENTS
1,173,062   10/1958   France.
1,264,024    5/1961   France.
1,289,522   12/1962   France.
1,078,944    3/1960   Germany.

HUGO O. SCHULZ, *Primary Examiner.*